United States Patent
Duplessis et al.

(10) Patent No.: US 8,788,497 B2
(45) Date of Patent: Jul. 22, 2014

(54) AUTOMATED CRITERION-BASED GROUPING AND PRESENTING

(75) Inventors: Jean-Pierre Duplessis, Redmond, WA (US); Chris Lovett, Woodinville, WA (US); Craig Symonds, Woodinville, WA (US); Jacob Meyer, Honolulu, HI (US); Scott Marison, Honolulu, HI (US); Allen Denver, Mililani, HI (US); Tracey Trewin, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 12/210,815

(22) Filed: Sep. 15, 2008

(65) Prior Publication Data

US 2010/0070497 A1    Mar. 18, 2010

(51) Int. Cl.
    *G06F 17/30*      (2006.01)
(52) U.S. Cl.
    USPC .................... 707/737; 707/E17.089; 717/120
(58) Field of Classification Search
    CPC .................... G06F 17/3071; G06F 17/30864; G06F 17/30598
    USPC ................ 707/737, E17.089, 999.1; 717/120
    See application file for complete search history.

(56) References Cited

U.S. PATENT DOCUMENTS

| | | | | |
|---|---|---|---|---|
| 5,392,278 A * | 2/1995 | Teel et al. | | 370/312 |
| 5,450,535 A | 9/1995 | North | | |
| 5,596,703 A | 1/1997 | Eick | | |
| 7,080,375 B2 * | 7/2006 | Martin | | 718/100 |
| 7,174,540 B2 * | 2/2007 | Ondrusek et al. | | 717/120 |
| 7,249,134 B2 * | 7/2007 | Simonin | | 1/1 |
| 7,275,063 B2 * | 9/2007 | Horn | | 1/1 |
| 7,343,365 B2 * | 3/2008 | Farnham et al. | | 715/853 |
| 7,383,516 B2 * | 6/2008 | Sauls et al. | | 715/854 |
| 7,552,139 B2 * | 6/2009 | Smith et al. | | 1/1 |
| 7,562,346 B2 * | 7/2009 | Jhanwar et al. | | 717/120 |
| 7,720,887 B2 * | 5/2010 | McCormack et al. | | 707/805 |
| 7,730,067 B2 * | 6/2010 | McCormack et al. | | 707/737 |
| 7,769,759 B1 * | 8/2010 | Gartung et al. | | 707/737 |
| 7,788,297 B2 * | 8/2010 | Weir et al. | | 707/805 |
| 7,792,868 B2 * | 9/2010 | Finkelstein et al. | | 707/798 |

(Continued)

OTHER PUBLICATIONS

"yED-Java Graph Editor"; http://www.yworks.com/en/products_yed_about.html, 2006.

(Continued)

*Primary Examiner* — Phuong Thao Cao
(74) *Attorney, Agent, or Firm* — Kevin Sullivan; Kate Drakos; Micky Minhas

(57) ABSTRACT

Interrelated items in a complex item set (such as a set of components in a complex software architecture) may be difficult to present in a manner that facilitates an understanding and evaluation of the item set, due to the amount of information and the difficulty in automatically discerning the organization of the item set. A set of criteria may be utilized to form criterion groups to which items matching respective criteria may be automatically assigned. Further grouping assignments may be achieved by identifying an ungrouped item that is associated with a grouped item. Such techniques may be applied in many variations to yield a representation of the item set, and a presentation of the item set to a user, that aggregates similar items and interrelationships, thereby promoting an understanding and analysis of the structure and organization of the item set while reducing the user involvement in the generation of same.

20 Claims, 5 Drawing Sheets

(56) References Cited

U.S. PATENT DOCUMENTS

| | | | |
|---|---|---|---|
| 7,813,919 B2 * | 10/2010 | Goutte | 704/9 |
| 7,917,511 B2 * | 3/2011 | Cannon et al. | 707/737 |
| 7,949,121 B1 * | 5/2011 | Flockhart et al. | 379/265.02 |
| 7,966,346 B1 * | 6/2011 | Jameson | 707/796 |
| 8,010,947 B2 * | 8/2011 | Carbone et al. | 717/121 |
| 8,027,980 B2 * | 9/2011 | Westendorf et al. | 707/737 |
| 8,499,284 B2 * | 7/2013 | Pich et al. | 717/120 |
| 2002/0087736 A1 * | 7/2002 | Martin | 709/312 |
| 2003/0078947 A1 * | 4/2003 | Garg et al. | 707/204 |
| 2004/0093593 A1 * | 5/2004 | Jhanwar et al. | 717/169 |
| 2004/0210826 A1 * | 10/2004 | Najork | 715/501.1 |
| 2004/0220688 A1 * | 11/2004 | Behrisch et al. | 700/96 |
| 2004/0236766 A1 * | 11/2004 | Simonin | 707/100 |
| 2004/0254938 A1 * | 12/2004 | Marcjan et al. | 707/100 |
| 2005/0198127 A1 * | 9/2005 | Helland et al. | 709/204 |
| 2006/0010425 A1 * | 1/2006 | Willadsen et al. | 717/120 |
| 2006/0036619 A1 * | 2/2006 | Fuerst et al. | 707/100 |
| 2006/0074836 A1 | 4/2006 | Gardner | |
| 2006/0149768 A1 * | 7/2006 | McCormack et al. | 707/101 |
| 2006/0149769 A1 * | 7/2006 | McCormack et al. | 707/101 |
| 2006/0235857 A1 * | 10/2006 | Sauls et al. | 707/100 |
| 2006/0290697 A1 | 12/2006 | Madden | |
| 2007/0143101 A1 * | 6/2007 | Goutte | 704/9 |
| 2007/0219964 A1 * | 9/2007 | Cannon et al. | 707/3 |
| 2008/0052203 A1 * | 2/2008 | Beyer et al. | 705/28 |
| 2008/0086551 A1 | 4/2008 | Moy | |
| 2008/0098332 A1 * | 4/2008 | LaFrance-Linden et al. | 715/846 |
| 2008/0115083 A1 * | 5/2008 | Finkelstein et al. | 715/805 |
| 2008/0140358 A1 | 6/2008 | Lang | |
| 2008/0155335 A1 | 6/2008 | Klein | |
| 2008/0175169 A1 * | 7/2008 | Deb et al. | 370/255 |
| 2008/0288562 A1 * | 11/2008 | Weir et al. | 707/205 |
| 2009/0100112 A1 * | 4/2009 | Sharma et al. | 707/202 |
| 2009/0112895 A1 * | 4/2009 | Halliday | 707/100 |
| 2009/0144319 A1 * | 6/2009 | Panwar et al. | 707/102 |
| 2010/0010876 A1 * | 1/2010 | Hur | 705/10 |
| 2010/0114587 A1 * | 5/2010 | Masuyama et al. | 705/1.1 |

OTHER PUBLICATIONS

"Social Software: Automatic Relationship Clustering"; http://www.dynamicobjects.com/d2r/archives/002564.html, 2004.

"Effective Graph Visualization Via Node Grouping"; http://www.ieeexplore.ieee.org/iel5/7626/20791/00963280.pdf?arnumber=963280, 2001.

* cited by examiner

| COMPONENT | DEPENDENCIES |
|---|---|
| COMPONENT A | COMPONENT F |
| COMPONENT B | COMPONENTS A, K |
| COMPONENT C | NONE |
| COMPONENT D | NONE |
| COMPONENT E | COMPONENTS A, K |
| COMPONENT F | COMPONENT C |
| COMPONENT G | NONE |
| COMPONENT H | COMPONENTS C, K |
| COMPONENT I | COMPONENT K |
| COMPONENT J | COMPONENT D |
| COMPONENT K | COMPONENT F |
| COMPONENT L | COMPONENTS B, J, E |
| COMPONENT M | COMPONENTS H, K |

AUTOMATED CRITERION-BASED GROUPING AND PRESENTING

BACKGROUND

Many computing scenarios involve the presentation of many related items in an item set, such as the components of a software architecture, devices communicating over a network, and related elements in a relational database. Where the associations between items are undirected (e.g., a peer relationship between two computers on a: network), the item set may comprise an undirected graph. Alternatively, some or all of the associations are directed, such as a superior/subordinate relationship between two items (e.g., a server/client relationship between two computers on a network), and the item set may comprise a partly or wholly directed graph. The items may be presented to a user, such as in a software architecture diagram, a network map, and a visual relational database schema. The presentation of such items may facilitate the user in exploring various aspects of the item set, such as the types of items contained therein, the relationships thereamong, and the hierarchy established by the directed relationships among items.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many scenarios, an item set may comprise a large number of items. For example, a software architecture for a complex application, such as an operating system, may comprise thousands of interrelated components; a network map may contain several thousand devices distributed across a global scale; and a database may comprise thousands of tables, stored procedures, user accounts, etc. having thousands of relationships with various semantics.

In such scenarios, it may be difficult to analyze and present information about the complex relationships. The analysis may be complicated by the difficulty in determining the relative significance of various items and the semantics of the relationships; and a presentation of the complex item set may overwhelm a user with excessive information that hinders an understanding of the overall structure of the item set and the relationships of the items. It may be even more difficult to analyze the item set or generate such a presentation in an automated manner, because a comparatively uninformed automated process may be unable to deduce structural and semantic significance without extensive trial-and-error and user input.

A technique for improving the analysis and presentation of information about such item sets involves an automated grouping of the items according to criteria. For example, the components of a software architecture representing an operating system may be grouped according to the subsystems managed thereby, such as memory management, file system, process scheduling and execution, and networking; and the devices comprising a network of a corporation may be grouped by the business groups utilizing such devices and the locations thereof. An automated process may endeavor to organize the items of the item set by forming groups representing respective criteria, and by assigning items matching the criteria to respective criterion groups. This process may be extended by identifying ungrouped items that are related to grouped items, and placing them in the same group as the ungrouped items. This grouping may continue, e.g. in an iterative process, until the groupable items have been assigned to groups, and the remaining items may be assigned to an unassigned items group. This automated grouping may yield structural information about the nature and hierarchical organization of the item set that may be of direct use to a user or analytic process. Alternatively or additionally, a presentation of the information (e.g., a visual map) may be automatically generated that utilizes the grouping information to structure the item set, and to produce a top-level presentation that factors the items into general groups based on commonalties and relationships. Such automated techniques may therefore facilitate analyses and presentations of complex item sets according to a comparatively simple set of criteria and with little or no user involvement.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figures 1, 2:
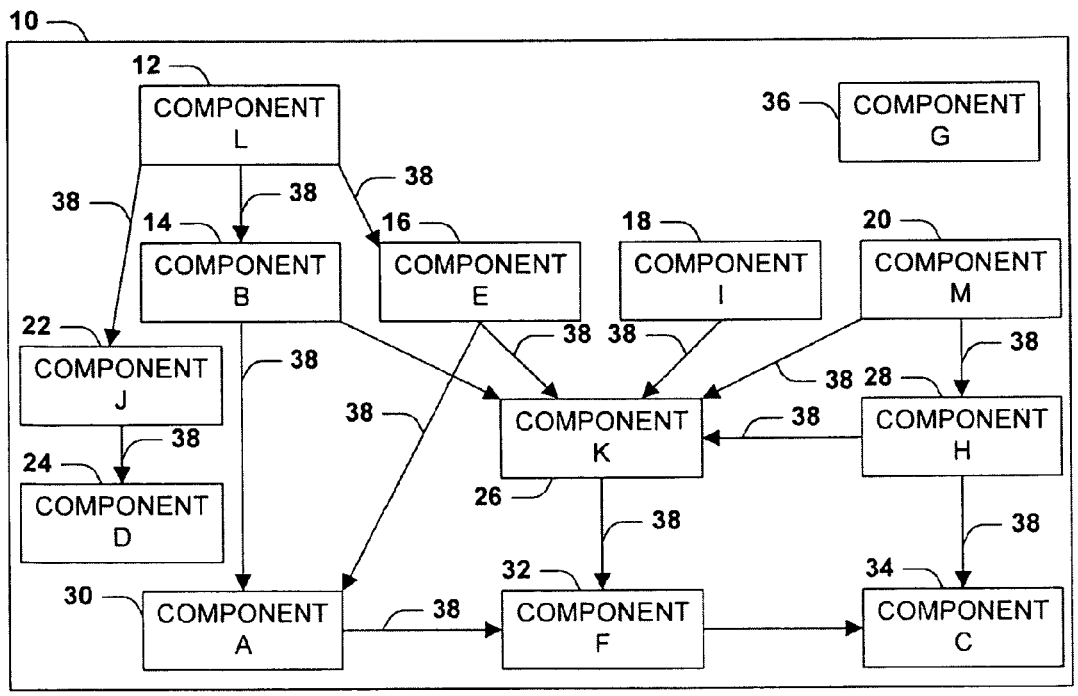
FIG. 1 is a component block diagram illustrating an exemplary item set representing the components an exemplary software architecture.
FIG. 2 is a functional dependency table illustrating the associations among the components of the exemplary software architecture of FIG. 1.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve an analysis or presentation of an item set comprising a large number of associated items. For example, a software architecture for an operating system may involve thousands of interoperating components with many types of dependencies and many structural nuances. Similarly, a network architecture may involve thousands of components, such as servers, workstations, storage components, routers, firewalls, and transceivers, that cooperatively manage many types of data flow through the network over a wide geographic region. A relational database, such as a data warehouse, may also comprise thousands of tables storing billions of interrelated records that may be accessed by many applications and processes through many protocols, stored procedures, and security features such as user accounts and code-access privileges.

FIG. 1 illustrates an example featuring a portion of a software architecture illustrated as an item set 10 comprising various items representing various software components and functional dependencies 38 between such components. The items and functional dependencies 38 therebetween may represent, e.g., a method that invokes another method while completing its operation, a class that includes another class, or a server/client or manager/worker design pattern. For example, a first component identified as Component L 12 may have a functional dependency 38 on a second component identified as Component B 14. Component B 14 may in turn have a functional dependency 38 on Component A 30, just as several other components in the item set 10 functionally depend on many other components. Together, these items may represent an interrelated set of software components that cooperatively achieve a desired result. Moreover, the layout of FIG. 1 illustrates an organizational hierarchy, wherein software components may be grouped in layers (e.g., a low-level layer comprising Component A 30, Component F 32, and Component C 34; a mid-level layer comprising Component K 26 and Component H 38; and a top-level layer comprising Component B 14, Component E 16, Component I 18, and Component M 20.)

Such item sets may be the focus of many types of analysis. For example, a software engineer may seek to understand the organization and interactions of the components of a software architecture; a network engineer may investigate the hierarchy of a complex network; and a database engineer may wish to validate and optimize the structure of a relational database. Such tasks may involve various statistical and heuristic computations (e.g., normalization assessment of a relational database and code profiling of the components of a software architecture.) Accordingly, analysts may wish to understand and evaluate various aspects of such item sets at different levels of detail, such as a top-level view of the basic elements of the item set, or the items within a particular semantic portion of the item set (e.g., by identifying and evaluating only the components of a software architecture that are involved in memory management.) For example, in the exemplary item set 10 of FIG. 1, a software engineer may wish to identify a layering of software components.

However, such analyses may be complicated by the complexity and volume of information comprising the items of the item set and the relationships thereamong. For example, while reviewing the interrelated components in the exemplary item set 10, a software engineer may not have access to the well-organized hierarchical diagram and semantic information presented in FIG. 1 (e.g., where the software engineer is attempting to understand undocumented or poorly documented software, or reverse-engineer a software architecture without access to the source code, etc.) The software engineer might be able to differentiate the components and to determine functional dependencies (e.g., by utilizing code profiling tools that measure the flow of process and thread execution through various software modules and map inter-component dependencies.) However, this information may be difficult to translate into a plain understanding of the structure of the item set 10. For example, FIG. 2 illustrates a functional dependency table 40 that may be produced by a code profiling tool. While the information included in the functional dependency table 40 includes all of the significant dependencies illustrated in the layout of FIG. 1, the hierarchical information and flow of the software architecture are obscured by the amount and organization of the information. This difficulty may increase exponentially as the complexity of the item set 10 grows to encompass thousands or millions of diverse items having many nuanced types of interrelationships. Therefore, it may be very difficult to extract the more significant architectural information, and deriving the layout of FIG. 1 may involve a large amount of inefficient trial-and-error computation and/or user participation in identifying significant sets of components and relationships. Similar complexities may be encountered in other scenarios involving similar sets of interrelated items, such as devices comprising a vast, broadly distributed network and a large data warehouse comprising many relational databases and data-driven applications.

Some techniques for addressing the complexities of such scenarios involve an automated grouping of items in the item set based on selected criteria. Such criteria may be specified by a user and/or derived from another automated process (e.g., a code profiling technique that selected particularly heavily utilized components.) A set of criterion groups may be formed, each specifying a criterion for items assigned to the criterion group. The items matching one of the criteria may be assigned to the respective criterion group, but a number of items may not match any criteria. Therefore, the associations of the grouped items may be considered, and an ungrouped item related to a grouped item may be assigned to the same criterion group as the grouped item. This process may continue, e.g., for a desired number of enumerations, or until all groupings that may be made in this manner have been made. Ungrouped items may then be handled in many ways, e.g., by assigning them to an "ungrouped items" group comprising the items that neither match any of the criteria nor are related (directly or indirectly) to items that match such criteria. The grouping information may then be used in the analysis of the item set 10, and may be used to present the items of the item set 10, e.g., as a visual layout that may be cognizable to a user.

Figure 3:
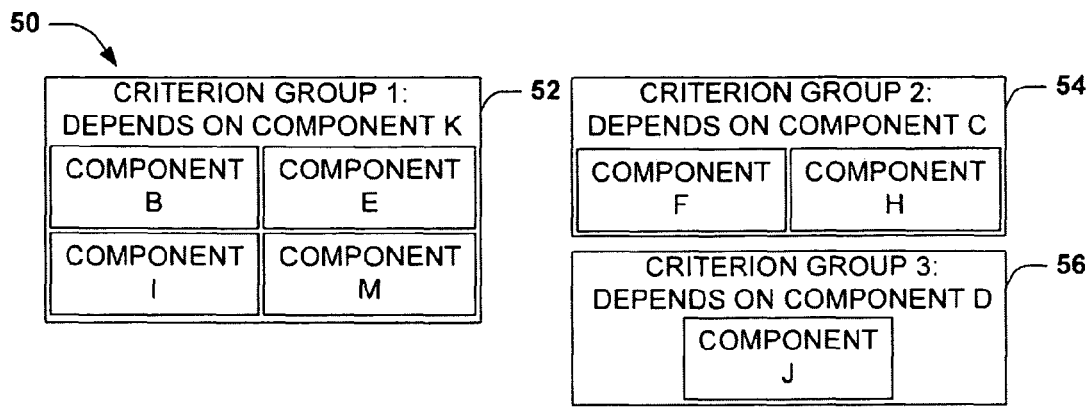
FIG. 3 is an illustration of a first state of an automated grouping of the items of the item set illustrated in FIG. 1.
Figure 4:
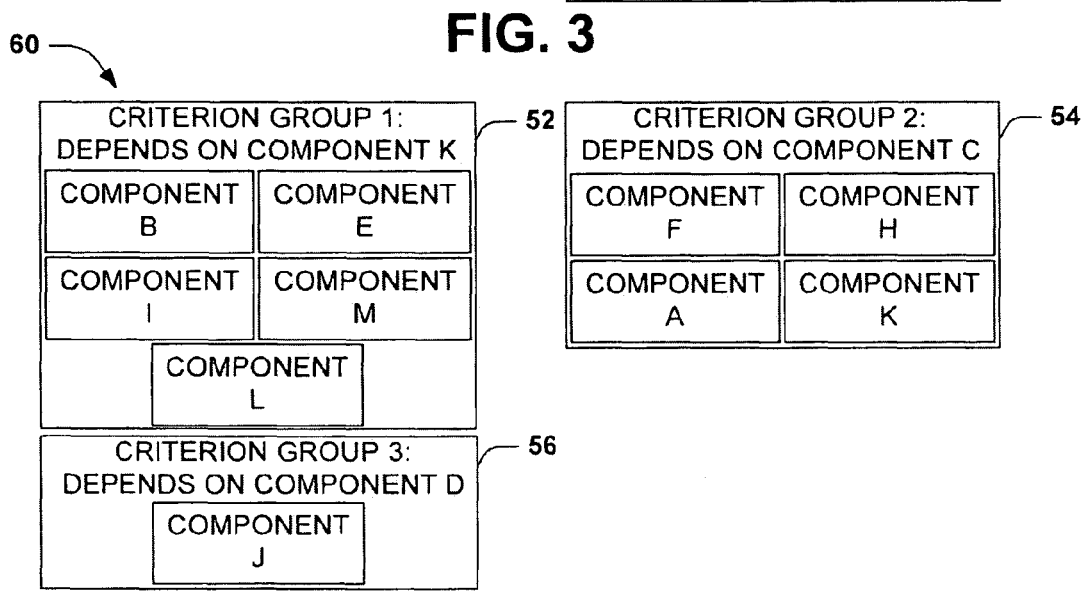
FIG. 4 is an illustration of a second state of an automated grouping of the items of the item set illustrated in FIG. 1.
Figure 5:
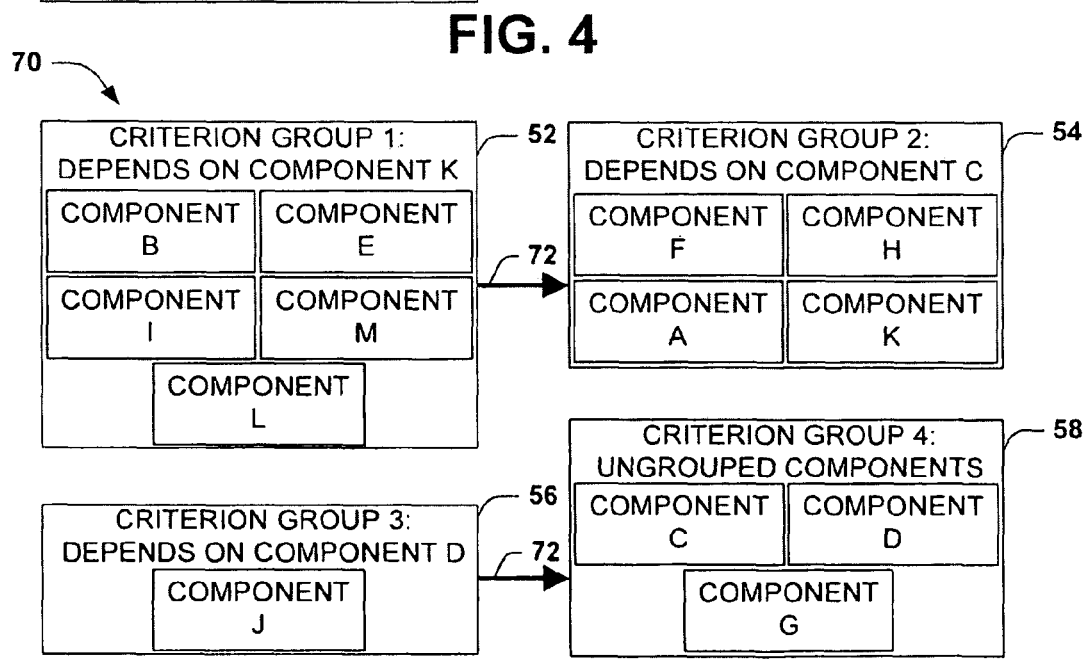
FIG. 5 is an illustration of a third state of an automated grouping of the items of the item set illustrated in FIG. 1.

FIGS. 3-5 illustrate a grouping of the items of the exemplary item set 10 of FIG. 1 according to these techniques. Three criteria are specified: a functional dependency on Component K 26; a functional dependency on Component C 34; and a functional dependency on Component D 24. (For example, based on the exemplary functional dependency table 40 of FIG. 2, a user or code profiler may determine that Component C 34 and Component D 24 appear to comprise the lowest-level functionality, while Component K 26 appears to be a heavily utilized component.) Accordingly, FIG. 3 illustrates a first state 50 of the grouping, wherein three criterion groups are formed: a first criterion group 52 for functional dependencies on Component K 26; a second criterion group 54 for functional dependencies on Component C 34; and a third criterion group 56 for functional dependencies on Component D 24. The items satisfying such criteria may be assigned to the respective criterion groups. Accordingly, Component J 22 is assigned to the third criterion group 56, while Component H 28 is assigned to the second criterion group 54, etc.

After the assigning in the first state 50 of FIG. 3, several items remain ungrouped. Accordingly, and as illustrated in the second state 60 of FIG. 4, the associations of the ungrouped items may be examined to determine relationships with grouped items that may permit associative grouping. For example, ungrouped Component A 30 is associated with Component F 32, which has been assigned to the second criterion group 54; accordingly, Component A 30 may be also assigned to the second criterion group 54 (thereby representing an indirect functional dependency on Component C 34 through Component F 32.) Similarly, ungrouped Component L 12 is associated with Component B 14, which is assigned to the first functional group 52, and therefore in the second state 60 Component L 12 is also assigned to the first functional group 52.

This associative grouping may continue until a stop condition is detected (e.g., either no more associative grouping may be attained, or a desired number of grouping evaluations have been performed.) At the end of this process, some items may remain ungrouped (e.g., Component C 34 and Component D 24, as lowest-level software components, do not have any functional dependencies, and Component G 36 is not functionally dependent on any other component.) These ungrouped items may be grouped together in an "ungrouped items" group, such as illustrated in the third state 70 of FIG. 5. Additional techniques may also be applied; e.g., the associations among units may be extrapolated as criterion group associations 72 among criterion groups, and may be included in the presentation. It may be appreciated that the grouped presentation of the items of FIG. 5 may be much more informative as to the hierarchical structure, flow, and dependencies of the item set 10 than the functional dependency table 40 of FIG. 2. Moreover, as illustrated in FIGS. 3-5, this associative grouping may be achieved in an automated manner through the specification of only a few basic criteria, thereby reducing the input of human analysis and avoiding the inefficiency of trial-and-error automated evaluation.

Figure 6:
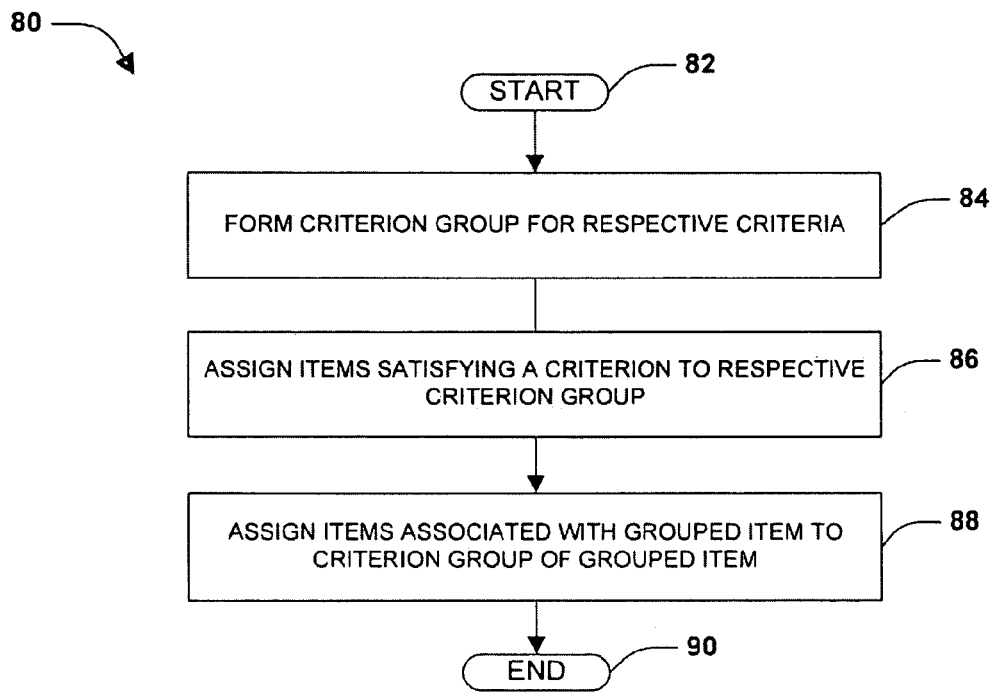
FIG. 6 is a flow chart illustrating an exemplary computer-implemented method of grouping associated items in an item set according to at least one criterion.

FIG. 6 presents a first embodiment of these techniques, illustrated as an exemplary computer-implemented method 80 of grouping associated items in an item set according to at least one criterion. The exemplary method 80 begins at 82 and involves forming 84 a criterion group for respective at least one criterion. The exemplary method 80 also involves assigning 86 items satisfying a criterion to the respective criterion group. The exemplary method 80 also involves assigning 88 items associated with a grouped item to the criterion group of the grouped item. Having achieved the associative grouping of items in criterion groups in an automated manner, the exemplary method 80 thereby identifies organizational information about the item set based on the specified criteria, and so ends at 90.

Figure 7:
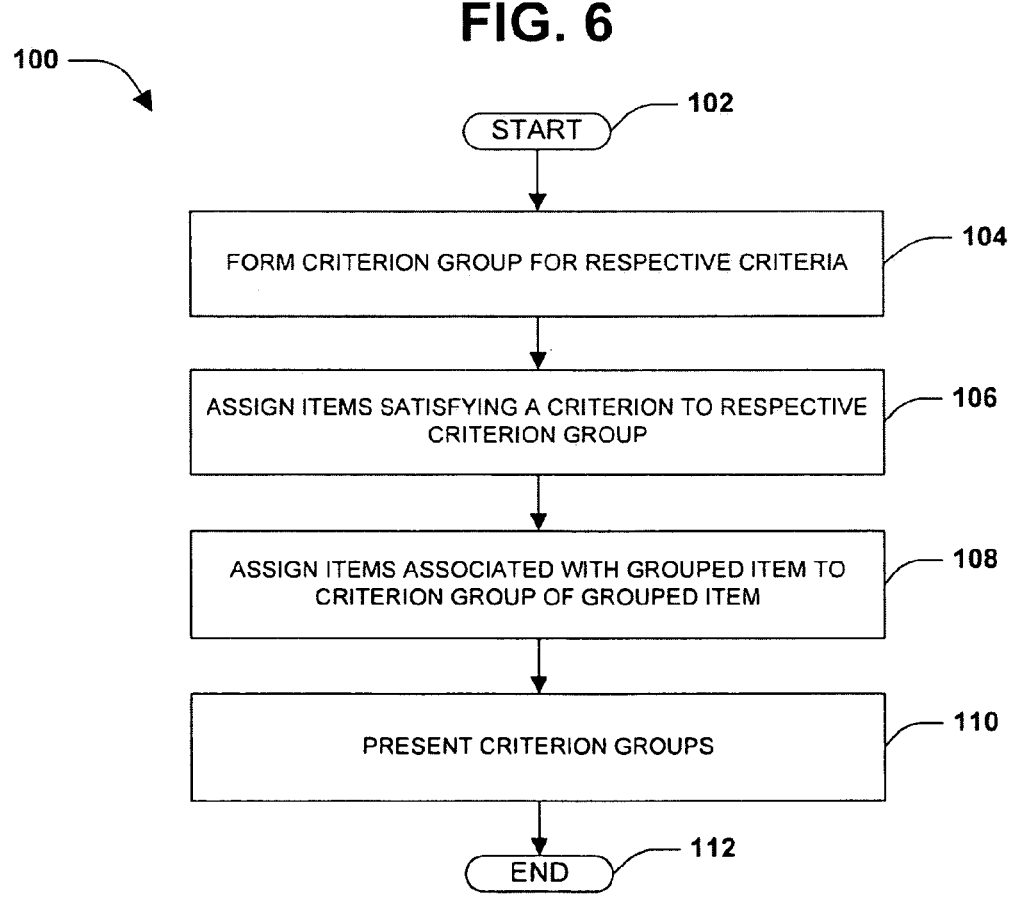
FIG. 7 is a flow chart illustrating an exemplary computer-implemented method of presenting associated items in an item set grouped according to at least one criterion.

FIG. 7 presents a second embodiment of these techniques, illustrated as an exemplary computer-implemented method 100 of presenting associated items in an item set grouped according to at least one criterion. This exemplary method 100 begins at 102 and involves forming 104 a criterion group for respective at least one criterion. The exemplary method 100 also involves assigning 106 items satisfying a criterion to the respective criterion group, and assigning 108 items associated with a grouped item to the criterion group of the grouped item. In addition, this exemplary method 100 involves presenting 110 the at least one criterion group (e.g., as a visual representation, such as illustrated in FIG. 5.) Having achieved a presenting of the item set according to the derivation of groupings in an automated manner, the exemplary method 100 facilitates the evaluation of the broader structure and flow of the items in the item set, and so ends at 112.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 6 and the exemplary method 100 of FIG. 7) to confer individual and/or synergistic advantages upon such embodiments.

A first aspect that may vary among implementations of these techniques relates to the scenario in which the techniques may be utilized. As a first example, the item set and associated items contained therein may involve many computing scenarios, such as interoperating components in a software architecture, devices communicating over a network, and elements in a database system. The associations may also comprise many types of relationships between items, such as (e.g.) a dependency of a grouped node on an ungrouped node; a dependency of an ungrouped node on a grouped node; a chronological ordering; a descendant relationship of versions of a software resource in a version-controlled software project; a lineage of inherited class types in a software library; etc. The grouping techniques described herein may be utilized to organize and present the items of such complex systems for use by users and other automated processes. As a second example, the criteria used to define the groups may be defined by a user, synthesized based on user actions and/or preferences, and/or specified by another automated process. As a third example, the presenting may comprise many forms of presentation, such as a visual layout rendered on a display, a human-readable text description provided to a user, and an organized data file to be utilized by other processes. Those of ordinary skill in the art may devise many scenarios to which these techniques may be applied and many uses for the products thereof.

A second example that may vary among embodiments of these techniques relates to the manner of assigning items to criterion groups. As a first example, the relationship of items to groups may be mutually exclusive, or may be nonexclusive, such that an item matching several criteria (or associated with items matching such criteria) may be assigned to several criterion groups. The criteria may also be specified with varying priorities, such that an item that might be assigned to two criterion groups is preferentially assigned to the criterion group for a first criterion of higher priority than that of a second criterion of lower priority, etc.

As a second example, the process of assigning items to groups may be organized in many ways. In a first embodiment, a first criterion may be evaluated more than once, and even to exhaustion, before evaluating a second criterion. For instance, the first criterion may be evaluated against the items of the item set to assign the items matching the criterion to the respective first criterion group. These grouped items for the first criterion may then be examined for associations with ungrouped items, which may also be added to the first criterion group and evaluated in turn, etc. After evaluating the first criterion, the second criterion may be evaluated against the remaining ungrouped items, etc. In a second embodiment, and as illustrated in FIGS. 3-5, the evaluation may be structured as a series of iterations, with all criteria evaluated together against the ungrouped items during an iteration. For instance, the grouped items for a first criterion group are evaluated once to identify associated ungrouped items that may be assigned to the criterion group, and then the grouped items of a second criterion group may be similarly evaluated, etc. When all of the criterion groups have been evaluated, the first criterion group may be evaluated in a second iteration, followed by the second criterion group, etc.

One particular scenario that may arise during a parallel, iterative evaluation of criteria involves an identification of an item that may be assigned to two criterion groups in the same iteration. For example, and with reference to FIG. 1, during the second iteration of the assigning (such as existing at the beginning of the second state 60 of FIG. 4), ungrouped Component L 12 may be assigned either to the third criterion group 56 representing components dependent on Component D 24 or to the first criterion group 52 representing components dependent on Component K 26. Component L 12 therefore represents an ungrouped but multiply assignable item. Many techniques may be devised to choose among several groups. In a first such embodiment, the criteria may be prioritized, so that the multiply assignable item may be preferentially assigned to a higher-priority criterion group instead of a lower-priority criterion group during an iteration. In a second such embodiment, a multiply assignable item may be aliased to produce a plurality of references to the same item, such that a reference may be assigned to the respective groups to which the item is assignable. In a third such embodiment, the choice of criterion groups may be based on voting, such as by counting the items of the respective criterion groups with which the ungrouped item is associated and assigning the ungrouped item to the criterion group having more associated items. Turning again to FIG. 1, Component L 12 is associated with the third criterion group 56 only through Component J 22, but is associated with the first criterion group 52 through associations with both Component B 14 and Component E 16. Because Component L 12 is associated with more items in the first criterion group 52 than the third criterion group 56, the former criterion group may be selected to complete the voting process.

As a third example of this second aspect, the end condition may be selected in many ways. For example, the items may be processed until no more ungrouped items may be associated with a group, or until a certain percentage of the items are grouped, or until a certain number of iterations has been completed, etc. Those of ordinary skill in the art may devise many techniques for formulating the evaluation and grouping of items while implementing the techniques discussed herein.

A third aspect that may vary among embodiments of these techniques relates to the handling of unassignable items, such as those that neither satisfy any criteria nor are associated with any grouped items. As a first example, the unassignable items may simply be left ungrouped, and may be presented as ungrouped items alongside the criterion groups. As a second example, the unassignable items may be assigned to an unassigned items group. In one such embodiment, the unassigned items group may be formed before the assigning (e.g., while forming the criterion groups.) All of the items may initially be placed in the unassigned items group, and may be removed from the unassigned items group upon assignment to a criterion group. The items remaining in the unassigned items group upon completing the assigning may therefore be treated as unassignable items. In another embodiment, and as illustrated in the third state 70 of FIG. 5, the unassigned items group 58 may be populated after the assigning with items that are not associated with a criterion group. Those of ordinary skill in the art may devise many ways of handling unassignable items while implementing the techniques discussed herein.

Figure 8:
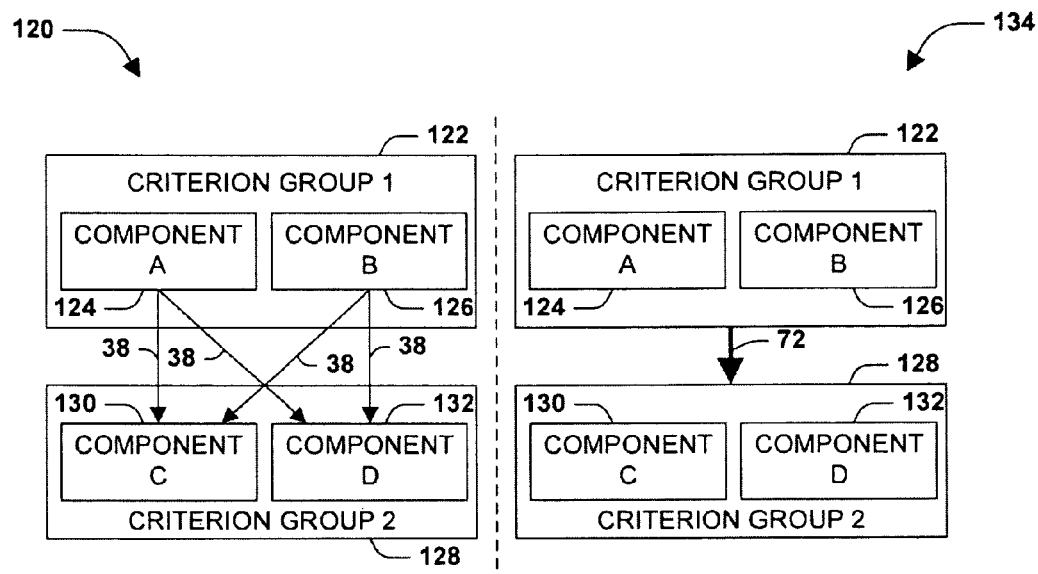
FIG. 8 is an illustration of a set of exemplary representations of an item set that features a criterion group association.

A fourth aspect that may vary among implementations of these techniques relates to the processing of criterion groups based on the assignment of items. While the assignment of items may provide useful information about the commonalities and relationships of items, additional information may be derived that may provide additional utility. As a first example, associations of items among criterion groups may be extrapolated as associations among the criterion groups as encompassing entities. One technique for achieving this extrapolation involves forming criterion group associations representing associations between criterion groups. FIG. 8 illustrates an exemplary scenario involving a first representation 120 of an item set comprising associated items that are grouped according to criterion as described herein. This representation includes a first criterion group 122 to which Component A 124 and Component B 126 are assigned and a second criterion group 128 to which Component C 130 and Component D 132 are assigned. Component A 124 has associations (possibly representing functional dependencies 38) with Component C 130 and Component D 132, and Component B 126 also has associations with Component C 130 and Component D 132. However, the large number of associations may complicate the evaluation of the grouping and the hierarchy of the item set. Instead, a second representation 134 may be devised wherein the associations are extrapolated as a criterion group association 72 between the first criterion group 122 and the second criterion group 128, indicating that at least one item in the first criterion group 122 is associated with at least one item in the second criterion group 128. In one such embodiment, upon identifying a first item of a first criterion group associated with a second item of a second criterion group, a criterion group association may be created between the first criterion group and the second criterion group. This second representation 134 may provide sufficient information about the organization of the criterion groups while reducing extraneous and potentially redundant information.

Figure 9:
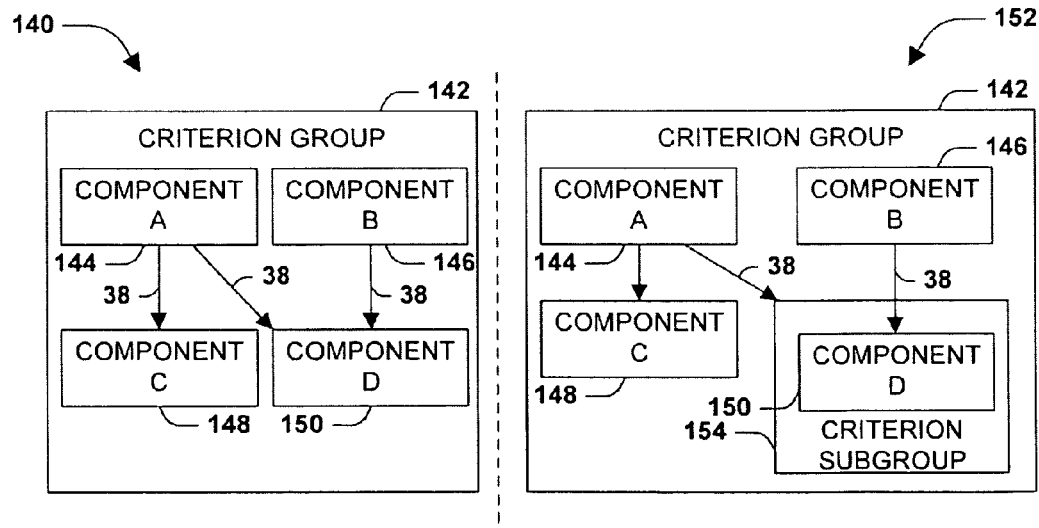
FIG. 9 is an illustration of a set of exemplary representations of an item set that features a criterion subgrouping.

A second example of this fourth aspect relates to a further evaluation of items assigned to various criterion groups to identify additional structure among the grouped items. In one such embodiment, the items within a criterion group may be additionally grouped by applying these techniques with a new set of criteria. This recursive application may result in a set of deeply nested criteria groups, each containing a set of lower-level groups that further illustrate the organization of the items of the item set. In a second such embodiment, the items assigned to a criterion group may be sub-grouped in various ways. FIG. 9 illustrates a second such embodiment, wherein a first representation 140 of the item set involves a criterion group 142 containing Component A 144 having functional dependencies 38 on Component C 148 and Component D 150 in the same criterion group 142, and Component B 146 having a functional dependency 38 on Component D 150. A subgrouping may be applied for items that are depended upon more than once, such as, upon identifying a first item assigned to a criterion group that is associated with at least two other items assigned to the criterion group, forming a criterion subgroup within the criterion group and assigning the first item to the criterion subgroup. In the scenario of FIG. 9, when the dual dependency of Component A 144 and Component B 146 on Component D 150 is detected, a second representation 152 may be generated wherein a criterion subgroup 154 is created to which Component D 150 may be assigned. Those of ordinary skill in the art may devise many techniques for subgrouping or further analyzing the items within various criterion groups while implementing the techniques discussed herein.

A fifth aspect that may vary among embodiments of these techniques involves the manner of presenting an item set grouped as discussed herein. As a first example, and as a simplified presentation, the item set may be presented only as a set of criterion groups, with the details of the items assigned thereto obscured. The groups might also be presented with criterion group associations derived from item associations between groups, such as illustrated in FIG. 8, and/or with the presenting of subgroupings derived in various ways, such as illustrated in FIG. 9. As a second example, some or all of the items may be included in the presenting. For example, all items may be included in the presenting, or only certain sets of items, such as the items contained within one or more criterion groups. In one such embodiment, the items may be presented within respective assigned criterion groups that have at least one criterion group association with at least one other criterion group, such that criterion groups that are isolated (and do not have any associations with other criterion groups) may be of less interest and may be obscured. Alternatively or additionally, the items assigned to one or more criterion groups may be initially hidden, and upon receiving a selection of a criterion group, the presenting system may also present the items assigned to the selected criterion group.

A second example of this fifth embodiment relates to the inclusion in the presenting of the associations among items. In one such embodiment, the associations among items may be omitted from the presenting (e.g., in favor of presenting criterion group associations that represent aggregate sets of associations among items of different criterion groups.) Alternatively, some or all of the item associations may be included in the presenting, such as (e.g.) only associations between items belonging to the same criterion group. In another such embodiment, the associations of an item may be initially hidden, and upon receiving a selection of an item, the presenting system may include the associations of the selected item with associated items in the item set.

A third example of this fifth embodiment relates to the arranging of the items and criterion groups in the presenting. It may be appreciated that the spatial organization of the items and criterion groups may convey various semantics, such as the relative significance of the items and criterion groups and/or the degree of interrelations thereamong. In one such embodiment, the associations between criterion groups and/or items may be directed, such as an association between a superior item or criterion group and a subordinate item or criterion group (such as may be included in the positioning semantics of the organization of the hierarchy.) For example, in the exemplary item set 10 of FIG. 1, the functional dependencies 38 are directed by an arrowhead to indicate a superior (functionally dependent) item of a higher layer and an inferior (functionally depended upon) item of a lower layer, such as the functional relationship between the superior Component K 26 and the subordinate Component F 32. As further illustrated in FIG. 1, the visual layout may suggest this superior/subordinate association by presenting the superior item in each association before the subordinate item in each association. This ordering may comprise (e.g.) a vertical layering, such as illustrated in FIG. 1, a horizontal ordering, and/or a data set presentation wherein the higher-level items are presented first. Accordingly, where an association between two items representing a semantic relationship between a superior item and a subordinate item, the presenting may comprise presenting the superior item before the subordinate item. The criterion group associations may be similarly organized in the presenting, such as by presenting a first criterion group comprising a first item before a second criterion group comprising a second item having a subordinate association with the first item. Those of ordinary skill in the art may devise many ways of organizing the items and criterion groups while presenting the item set according to the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
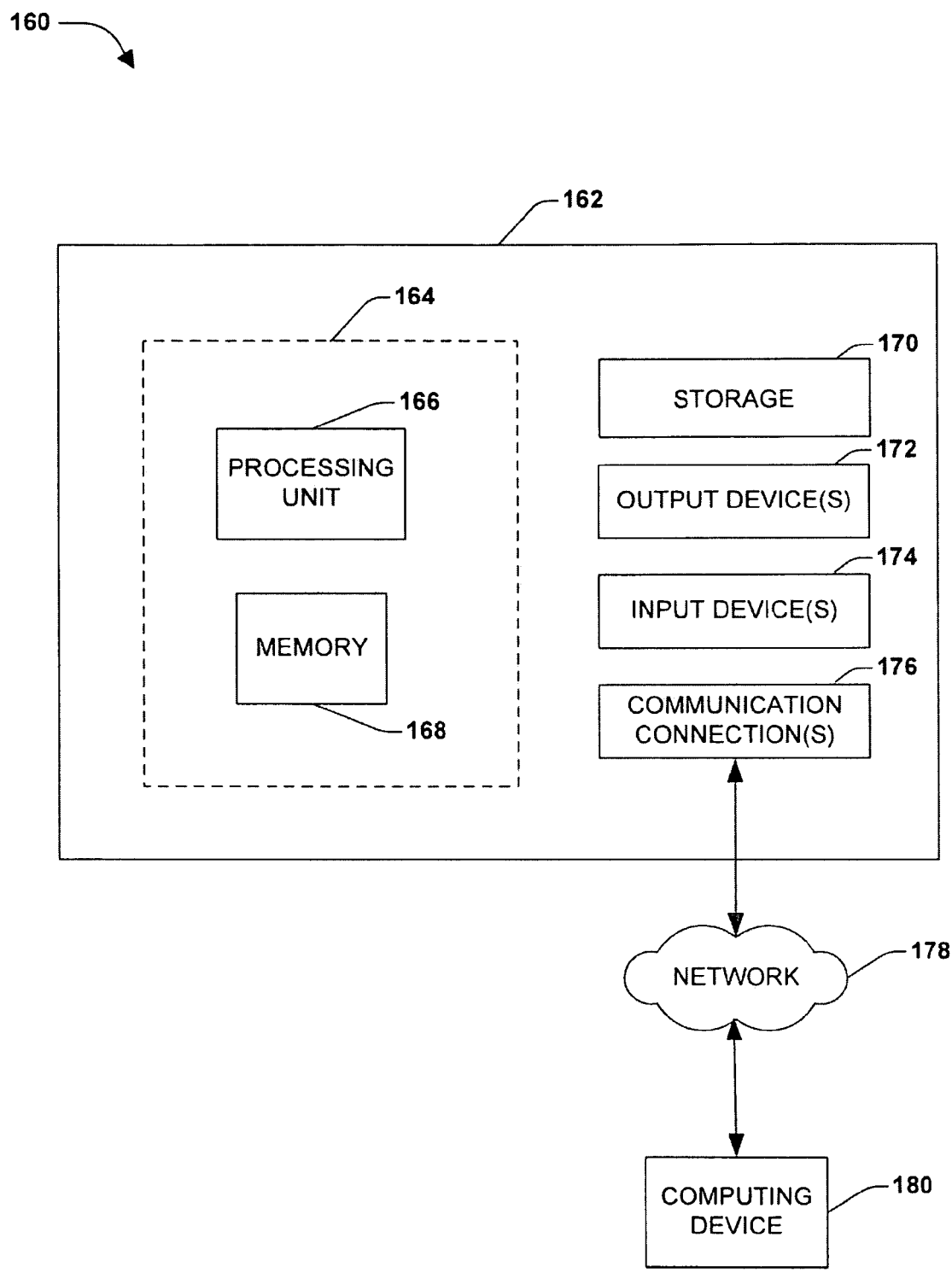
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 160 comprising a computing device 162 configured to implement one or more embodiments provided herein. In one configuration, computing device 162 includes at least one processing unit 166 and memory 168. Depending on the exact configuration and type of computing device, memory 168 may be volatile (such as RAM, for example), non-volatile (such as ROM, flash memory, etc., for example) or some combination of the two. This configuration is illustrated in FIG. 10 by dashed line 164.

In other embodiments, device 162 may include additional features and/or functionality. For example, device 162 may also include additional storage (e.g., removable and/or non-removable) including, but not limited to, magnetic storage, optical storage, and the like. Such additional storage is illustrated in FIG. 10 by storage 170. In one embodiment, computer readable instructions to implement one or more embodiments provided herein may be in storage 170. Storage 170 may also store other computer readable instructions to implement an operating system, an application program, and the like. Computer readable instructions may be loaded in memory 168 for execution by processing unit 166, for example.

The term "computer readable media" as used herein includes computer storage media. Computer storage media includes volatile and nonvolatile, removable and non-removable media implemented in any method or technology for storage of information such as computer readable instructions or other data. Memory 168 and storage 170 are examples of computer storage media. Computer storage media includes, but is not limited to, RAM, ROM, EEPROM, flash memory or other memory technology, CDROM, Digital Versatile Disks (DVDs) or other optical storage, magnetic cassettes, magnetic tape, magnetic disk storage or other magnetic storage devices, or any other medium which can be used to store the desired information and which can be accessed by device 162. Any such computer storage media may be part of device 162.

Device 162 may also include communication connection(s) 176 that allows device 162 to communicate with other devices. Communication connection(s) 176 may include, but is not limited to, a modem, a Network Interface Card (NIC), an integrated network interface, a radio frequency transmitter/receiver, an infrared port, a USB connection, or other interfaces for connecting computing device 162 to other computing devices. Communication connection(s) 176 may include a wired connection or a wireless connection. Communication connection(s) 176 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 162 may include input device(s) 174 such as keyboard, mouse, pen, voice input device, touch input device, infrared cameras, video input devices, and/or any other input device. Output device(s) 172 such as one or more displays, speakers, printers, and/or any other output device may also be included in device 162. Input device(s) 174 and output device(s) 172 may be connected to device 162 via a wired connection, wireless connection, or any combination thereof. In one embodiment, an input device or an output device from another computing device may be used as input device(s) 174 or output device(s) 172 for computing device 162.

Components of computing device 162 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 162 may be interconnected by a network. For example, memory 168 may be comprised of multiple physical memory units located in different physical locations interconnected by a network.

Those skilled in the art will realize that storage devices utilized to store computer readable instructions may be distributed across a network. For example, a computing device 180 accessible via network 178 may store computer readable instructions to implement one or more embodiments provided herein. Computing device 162 may access computing device 180 and download a part or all of the computer readable instructions for execution. Alternatively, computing device 162 may download pieces of the computer readable instructions, as needed, or some instructions may be executed at computing device 162 and some at computing device 180.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of grouping associated items in an item set into criterion groups according to at least one criterion on a device having a processor, the method comprising:

executing on the processor instructions that cause the device to:
  form a criterion group for respective at least one criterion;
  for items that satisfy the criterion of a selected criterion group, assign the items to the selected criterion group;
  while an ungrouped item of the item set is not assigned to any of the criterion groups:
    identify at least one grouped item that has been assigned to one of the criterion groups with which the ungrouped item is associated;
    if the ungrouped item is associated with only one grouped item, assign the ungrouped item to the criterion group of the only one grouped item; and
    if the ungrouped item is associated with at least two grouped items respectively assigned to different of the criterion groups:
      among the at least two grouped items, select a selected grouped item; and
      assign the ungrouped item only to the criterion group of the selected grouped item.

2. The method of claim 1:
the items comprising components of a software architecture;
at least one criterion comprising a dependency among the components in the software architecture; and
an association between a first component and a second component comprising a dependency of the first component on the second component.

3. The method of claim 1, comprising:
forming an unassigned items group; and
assigning ungrouped items that do not satisfy the criterion and that are not associated with the items of respective criterion groups to the unassigned items group.

4. The method of claim 3, comprising:
before assigning items to criterion groups, assigning the items of the item set to the unassigned items group; and
upon assigning an ungrouped item to a criterion group, removing the ungrouped item from the unassigned items group.

5. The method of claim 3, comprising:
assigning ungrouped items that do not satisfy the criterion and that are associated with a second item that has been assigned to the criterion group until no item is associated with a second item that has been assigned to the criterion group; and
assigning to the unassigned items group the items that have not been assigned to the criterion group.

6. The method of claim 1, wherein selecting the selected grouped item further comprising:
counting the grouped items of the respective criterion groups that are associated with the ungrouped item, and
among the criterion groups, assigning the ungrouped item to only one of the criterion groups having a greater number of items that are associated with the ungrouped item.

7. The method of claim 1, comprising: after assigning items to at least two criterion groups:
upon identifying a first item of a first criterion group associated with a second item of a second criterion group, creating a criterion group association between the first criterion group and the second criterion group.

8. The method of claim 1, comprising: upon identifying a first item assigned to a criterion group that is associated with at least two other items assigned to the criterion group:
forming a criterion subgroup within the criterion group, and
assigning the first item to the criterion subgroup.

9. The method of claim 1, further comprising: after assigning the items satisfying the criterion to the criterion group, performing at least one sequential iteration involving assigning to the criterion group ungrouped items not satisfying the criterion and that are associated with a second item that has been assigned to the criterion group.

10. A computer-readable memory device storing instructions that, when executed on a processor of a computing device, cause the computing device to group items in an item set into criterion groups according to at least one criterion by:
  forming a criterion group for respective at least one criterion;
  for items that satisfy the criterion of a selected criterion group, assigning the items to the respective criterion group;
  while an ungrouped item of the item set is not assigned to any of the criterion groups:
    identifying at least one grouped item that has been assigned to one of the criterion groups with which the ungrouped item is associated;
    if the ungrouped item is associated with only one grouped item, assigning the ungrouped item to the criterion group of the only one grouped item; and
    if the ungrouped item is associated with at least two grouped items respectively assigned to different of the criterion groups:
      among the at least two grouped items, selecting a selected grouped item; and
      assigning the ungrouped item only to the criterion group of the selected grouped item.

11. The computer-readable memory device of claim 10:
the items comprising components of a software architecture;
at least one criterion comprising a dependency among components in the software architecture;
an association between a first component and a second component comprising a dependency of the first component on the second component; and
the instructions further causing the computing device to present the software architecture to a user.

12. The computer-readable memory device of claim 10, comprising: presenting at least one criterion group association between a first criterion group to which a first item is assigned and a second criterion group to which a second item is assigned, where the second item is associated with the first item.

13. The computer-readable memory device of claim 12, comprising: presenting the items within respective assigned criterion groups that have at least one criterion group association with at least one other criterion group.

14. The computer-readable memory device of claim 10, comprising: presenting the items within respective assigned criterion groups.

15. The computer-readable memory device of claim 14, presenting the items comprising: upon receiving a selection of a criterion group, presenting the items assigned to the selected criterion group.

16. The computer-readable memory device of claim 14, comprising: presenting associations between a first item in a criterion group and a second item in the criterion group that is associated with the first item.

17. The computer-readable memory device of claim 14, comprising: upon receiving a selection of an item, presenting associations of the selected item with associated items in the item set.

18. The computer-readable memory device of claim 14:
an association between two items representing a semantic relationship between a superior item and a subordinate item; and
the presenting comprising: presenting the superior item before the subordinate item.

19. The computer-readable memory device of claim 14, comprising:
upon identifying a first item assigned to a criterion group that is associated with at least two other items assigned to the criterion group, presenting the first item in a criterion subgroup within the criterion group.

20. A method of identifying dependencies among components in a software architecture on a device having a processor, the method comprising:
executing on the processor instructions that cause the device to, upon receiving a request to identify dependent components in view of a selected component:
form a dependency group;
assign to the dependency group the components having a dependency on the selected component;
while an ungrouped component of the software architecture is not assigned to a dependency group:
identifying at least one grouped component with which the ungrouped component is associated and that has been assigned to a dependency group;
if the ungrouped component is associated with only one grouped component, assigning the ungrouped component to the dependency group of the only one grouped component; and
if the ungrouped component is associated with at least two grouped components respectively assigned to different dependency groups:
among the at least two grouped components, selecting a selected grouped component; and
assigning the ungrouped component only to the dependency group of the selected grouped component; and
present the dependency group in fulfillment of the request.

* * * * *